United States Patent [19]
Boyhont et al.

[11] 3,850,479
[45] Nov. 26, 1974

[54] FLOW GATE FOR A FLUIDIZING GRAVITY CONVEYOR

[75] Inventors: Donald S. Boyhont, Nazareth; Marvyn L. Souders, Allentown; David M. Matweecha, Bethlehem, all of Pa.

[73] Assignee: Fuller Company, Catasauqua, Pa.

[22] Filed: Aug. 13, 1973

[21] Appl. No.: 387,862

Related U.S. Application Data

[63] Continuation of Ser. No. 224,643, Feb. 8, 1972, abandoned.

[52] U.S. Cl. .................................. 302/29
[51] Int. Cl. ............... B65g 53/46, B65g 53/52
[58] Field of Search ............... 222/195; 302/29, 31; 251/306

[56] References Cited
UNITED STATES PATENTS

| | | | |
|---|---|---|---|
| 3,377,047 | 4/1968 | Scholl | 251/306 X |
| 3,480,331 | 11/1969 | Freeman et al. | 302/29 |

*Primary Examiner*—Evon C. Blunk
*Assistant Examiner*—W. Scott Carson
*Attorney, Agent, or Firm*—Frank H. Thomson

[57] ABSTRACT

A flow gate which is in the general form of a rectangular butterfly gate for use with a fluidizing gravity conveyor for granular particulate material such as cement or alumina. The flow control apparatus includes an open body having a wall dividing the body into upper and lower flow paths. The upper flow path is contiguous with the material chamber of the conveyor and the lower flow path is contiguous with the air plenum of the conveyor. A butterfly gate is mounted in the upper flow path for rotation about an axis parallel to the wall means and spaced between the wall means and the top of the body. A motor or manual means is provided for rotating the butterfly between a position which permits material to flow through the conveyor and a position which prevents such material flow. The butterfly gate is generally rectangular to conform to the shape of the conveyor.

4 Claims, 5 Drawing Figures

FLOW GATE FOR A FLUIDIZING GRAVITY CONVEYOR

This is a continuation of application Ser. No. 224,643, filed Feb. 8, 1972, now abandoned.

BACKGROUND OF THE INVENTION

This invention relates to flow control apparatus for fluidizing gravity conveyors and in particular to a rectangular butterfly gate for controlling the flow of pulverulent material through a fluidizing gravity conveyor.

Prior to the present invention, it was generally known that it is often desirable to control the flow of pulverulent material through a fluidizing gravity conveyor from the inlet or source of material to the outlet of the conveyor. This control is necessary for various reasons which form no part of the present invention.

The flow control apparatus in use prior to the present invention often consisted of a sliding gate. However, sliding gates have several disadvantages. One principal disadvantage of sliding gates is that it is difficult to achieve a complete seal which can be maintained for long periods of operation. When an easily fluidizable material, such as alumina or cement, is conveyed, there is a tendency for the material to leak past the sliding gate when it is closed. Attempts to form a lasting seal with a sliding gate have been unsatisfactory.

An additional disadvantage with sliding gates is that they can be difficult to close. If it is desired to close the sliding gate while material is flowing through the conveyor, the gate will contact the flowing material and will not seat. A further disadvantage of sliding gates as used to control flow is that they can be difficult to open and close after a period of operation because the gate will bind in its track.

Butterfly valves are generally known and in common usage for many applications, such as the control of liquid flowing through a conduit. Although the use of a butterfly valve for controlling the flow of pulverulent material may be known, heretofore, no practical buterfly gate arrangement has been provided which may be positioned in a fluidizing gravity conveyor for controlling the flow of pulverulent material through the conveyor and used to completely prevent the flow of material through the conveyor while permitting material on the donwstream side of the valve to be discharged from the conveyor.

Conventional circular butterfly valves would be difficult to apply to a fluidizing gravity conveyor. Conventionally, fluidizing gravity conveyors have a material chamber which is rectangular in configuration. This is primarily due to the techniques required in manufacturing such conveyors. If a round butterfly valve is used, a transition section from the round butterfly to the rectangular conveyor must be used. The transition must include an air plenum in order not to restrain or block the flow of material. Transition sections are expensive to manufacture and their elimination makes the use of a butterfly valve to control material flow economically practical. In addition, transitions are susceptible to high maintenance because they change the direction of flow and create wear points on the conveyor.

A further advantage of a butterfly gate is that it lends itself to control to thereby permit control of the amount of material which flows through the conveyor, and thus it can be used as more than an on-off control.

SUMMARY

It is, therefore, the principal object of this invention to provide a novel flow control apparatus for use with a fluidizing gravity conveyor for pulverulent materials.

It is a further object of this invention to provide a novel flow control apparatus which is capable of providing a seal to prevent pulverulent material flow in a fluidizing gravity conveyor.

It is another object of this invention to provide a flow control apparatus for a fluidizing gravity conveyor which is capable of modulating the flow of material through such a conveyor.

In general, the foregoing and other objects will be carried out by providing for use in combination with a fluidizing gravity conveyor for pulverulent material including an elongated conduit having a top, bottom and sidewalls, a gas permeable deck mounted therein dividing the conduit into an upper material chamber and a lower plenum chamber and an inlet for material to be conveyed and an outlet, a material flow control apparatus comprising: an open body member including wall means dividing the body member into an upper flow path adapted to communicate with the upper material chamber of the conveyor and a lower flow path adapted to communicate with the lower plenum chamber of the conveyor; a gate member mounted in the upper flow path for rotation about an axis parallel to said wall means; and means for rotating said gate member between a position which permits material to flow thorugh the upper flow path and a position which prevents material from flowing through the upper flow path; means adapted to provide a seal between the walls of the upper flow path and said gate member to thereby prevent material from flowing through the upper flow path.

BRIEF DESCRIPTION OF THE DRAWINGS

The invention will be described in connection with the annexed drawings wherein.

DESCRIPTION OF THE PREFERRED EMBODIMENT

Figure 1:
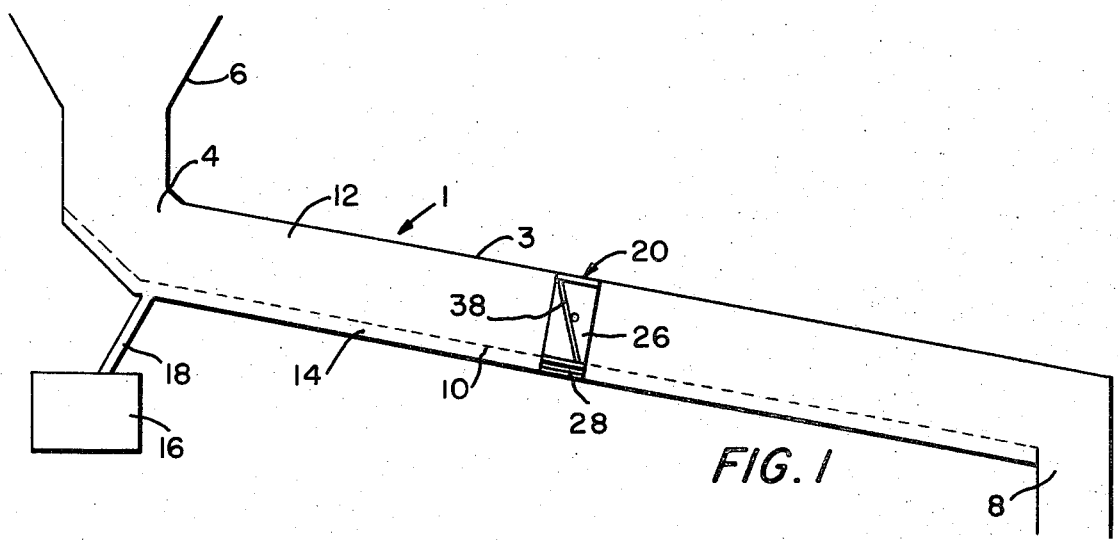
FIG. 1 is a diagrammatic view of a fluidizing gravity conveyor employing the flow control apparatus of the present invention.

Referring to the drawing and in particular to FIG. 1, there is shown a fluidizing gravity conveyor generally indicated at 1 which includes a conduit 3 having an inlet 4 adapted to be connected to a source of pulverulent material such as a hopper 6 and a material outlet 8. The conduit 3 is provided with a gas permeable deck 10 dividing the conduit 3 into an upper material chamber 12 and a lower plenum chamber 14. A source of gaseous fluid under pressure, such as a compressor or blower 16, is flow connected by a conduit 18 to the plenum 14.

The operation of a fluidizing gravity conveyor is generally known. Pulverulent material is supplied from the hopper 6 to the material chamber 12. Gaseous fluid is supplied to the plenum 14 for passage upwardly through the deck 10 to fluidize the material in the material chamber 12. The conveyor 1 is mounted so that it slopes downwardly. As the material is fluidized, it flows downwardly through the material chamber of the conveyor much as a liquid would through a downwardly sloping pipe.

The novel flow control apparatus is generally indicated at 20 and is positioned in the conveyor 1 intermediate the inlet 4 and outlet 8.

Referring to FIGS. 2 to 5, the flow control apparatus includes an open body member 22 having a wall means 24 which divides the body member into an upper flow path 26 and a lower flow path 28. Preferably, the body member is made separate from the conveyor sections and includes a plurality of holes 30 adapted for securing the body member 22 to the ends of two conveyor sections. When the body portion 22 is mounted to the conveyor sections, the upper flow path 26 is aligned with the material chamber 12 and the lower flow path 28 is aligned with the plenum chamber 14. The conveyor sections are conventionally made so that the material chamber is rectangular with the gas permeable deck flat. For this reason, the flow path 26 is rectangular and conforms in dimension to the material chamber.

Figure 2:
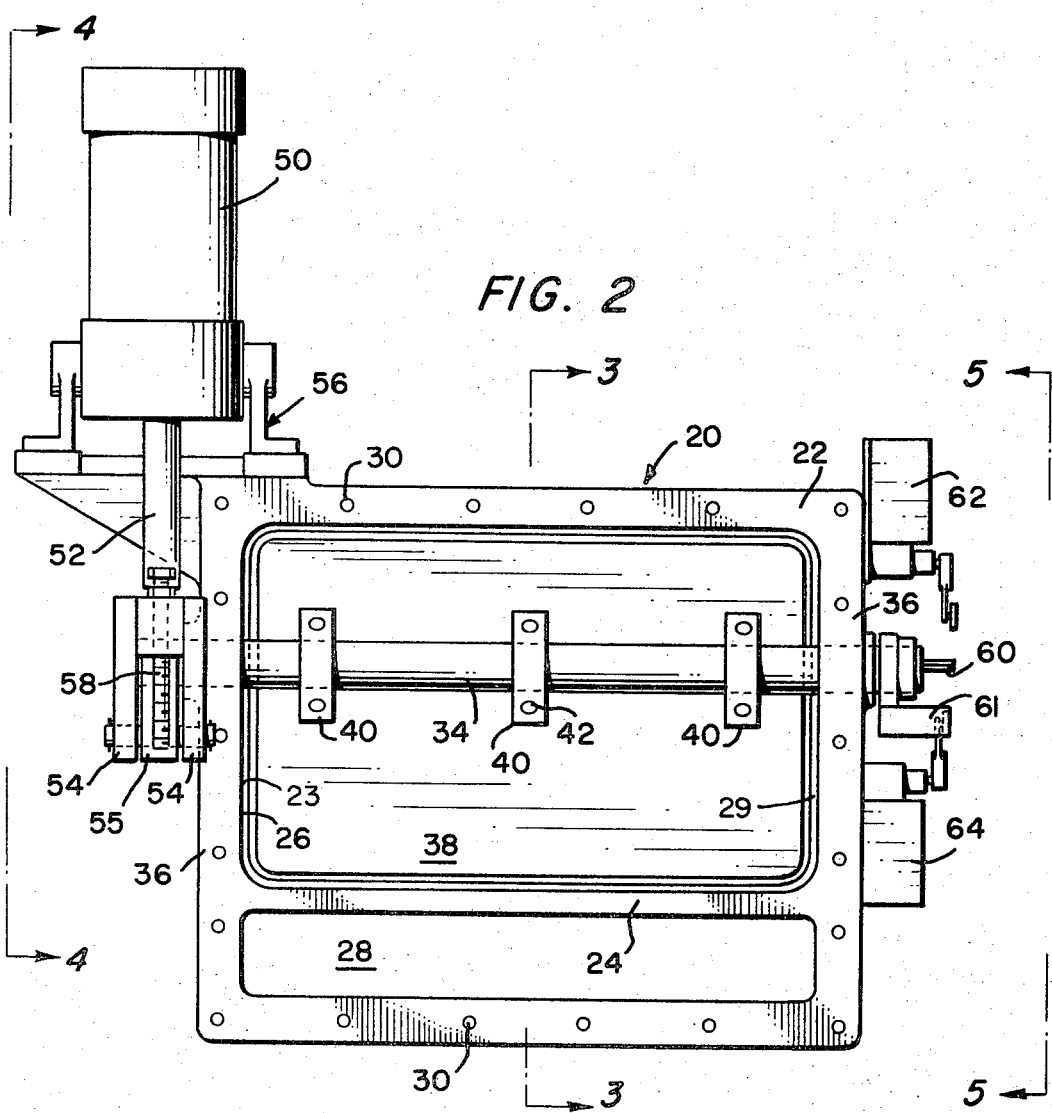
FIG. 2 is an elevational view of the flow control apparatus of the present invention.
Figure 5:
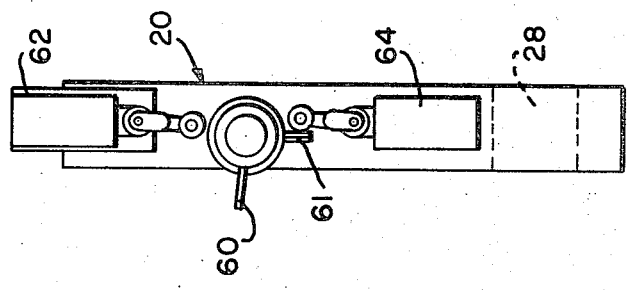
FIG. 5 is an elevational view of the flow control apparatus taken on the line 5—5 of FIG. 2.
Figure 4:
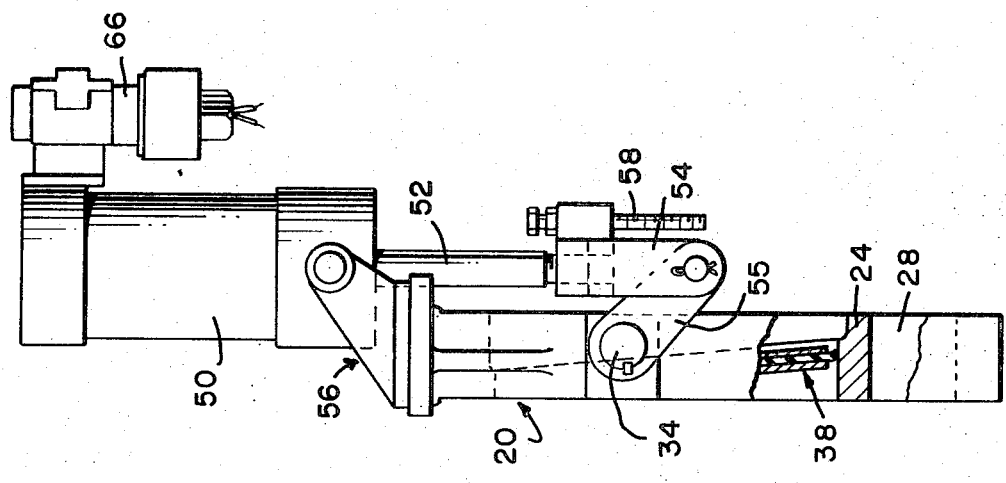
FIG. 4 is an elevational view partly in section of the flow control apparatus taken on the line 4—4 of FIG. 2.

A shaft 34 is journaled in the sidewalls 36 of the body member for rotation within the upper flow path 26 as shown in FIG. 2. A gate member 38 is secured to the shaft 34 by means of clamps 40 and set screws 42. The gate member 38 may include a rear plate 44 and a front plate 46 with an annular sealing ring 48 of elastomeric material secured therebetween by means of fasteners 49.

The wall means 24 is provided with a machined surface 25 and the top of the body member 22 is provided with a machined surface 27. The inner sidewalls of the flow path 26 are also machined so that the sealing ring 48 will sealingly engage the inner surfaces of the upper flow path 26 when the gate is in the closed position shown in FIG. 3 so that a material seal will be formed.

Means are provided for rotating the shaft 34 and hence the gate 38 about an axis which is parallel to the wall means 24 and hence the deck 10. If desired, the gate 38 may be manually operated. In the embodiment shown, a motor means 50 is provided which may be an air operated piston-cylinder arrangement having a piston rod 52 connected to the shaft 34 by means of lever arms 54 and 55. The motor means 50 is mounted on the body 22 by any suitable means, such as that generally indicated at 56. The lever arrangement 54, 55 may include an adjustment screw 58 for controlling the amount the gate 38 may be opened.

In the embodiment shown, switches are provided to serve as gate position indicators, an electrical interlock, or an electrical sequence control for the valve. On one end of the shaft 34 a pair of actuating members 60, 61 are provided. A pair of switches 62 and 64 are mounted on one wall 36 of the body 22.

In operation, when it is desired to permit pulverulent material to flow through the conveyor, air under pressure or other motive power is supplied to the motor means 50 to move the rod 52 upwardly and rotate the shaft 34 and gate 38 relative to the body 22 and the flow path 26. As viewed in FIG. 3, as the shaft 52 is moved upwardly, the gate 38 will move in a counterclockwise direction. This movement opens the flow path 26 to permit material upstream of the gate 20 to flow through the flow control apparatus towards the outlet 8 of the conveyor. Normally, material will flow under the gate 38 while spent fluidizing air which passes through the material will pass above the gate 38. The amount the gate opens is controlled by the adjusting rod 58 making contact with the motor means 50. When the gate 38 is open to the position set by the adjusting rod 58, the actuator 60 contacts the switch mechanism 62 which may be connected to any suitable indicator such as a light thereby indicating the gate 38 is in the desired open position.

Figure 3:
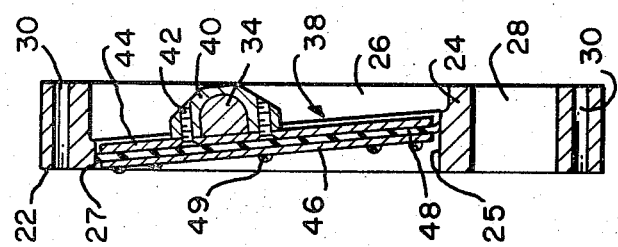
FIG. 3 is a sectional view of the flow control apparatus taken on the line 3—3 of FIG. 2.

When it is desired to stop the flow of material through the conveyor, motive fluid is supplied to the motor means 50 to lower the rod 52 and rotate the gate 38 clockwise. This clockwise movement will continue until the gate 38 comes to the closed position, as shown in FIG. 3, sealing against all sides of the flow path 26 to thereby prevent additional material from passing through the control apparatus. The actuator 61 contacts the switch 64 which may be connected to any suitable indicator such as a light to thereby indicate the gate 38 is in the closed position.

The flow control valve has been designed so that fluidizing air suppied to plenum 14 continuously flows through the valve to the conveyor sections downstream of the control valve 20. Because the lower flow path 28 is continuously open, material which has already passed through the flow control apparatus will continue to be aerated from the single source 16 even when the gate 38 is closed. This will insure that material downstream of the flow control apparatus 20 will be discharged from the conveyor 1.

Preferably, as shown in FIG. 3, in the closed position the gate 38 is at an angle to the conveyor 1 and flow path 26. The purpose of this is to permit easy opening of the gate when a head of material is pressing against the gate 38. In addition, the axis of rotation of the gate 38 is located above the center of the flow path 26, but below the top of the body 22. This insures a large material flow path under the gate and an adequate air flow path above the gate.

The flow control apparatus of the present invention is shown as including a motor means which is primarily designed as an open-closed arrangement. However, if desired, the motor means 50 or other suitable motor means could be operated to modulate the flow of material through the conveyor. With the arrangement shown, the volume of material flowing through the conveyor could be controlled by controlling the position of the gate 38 by controlling movement of the rod 52 in response to certain conditions such as the amount of material required per unit of time by a process.

Although material normally flows under the open gate 38 and spent fluidizing air flows over the open gate 38, if the valve is positioned close to the outlet of a bin, material may flow both under and over the open gate, at least when it is initially opened.

From the foregoing it should be apparent that the objects of this invention have been carried out. A flow control apparatus has been provided which will seal against the flow of pulverulent material through a fluidizing gravity conveyor. The apparatus is simple in construction and does not require use of any transition sections to flow from the conveying section to the flow control section to a second conveying section. The flow control apparatus is easily opened and closed because of its rotation about an axis parallel to the gas permeable deck of the conveyor and its angular position within the conveyor. Because a separate control valve body is used, a seal can be assured when the valve is closed.

It is intended that the foregoing description be merely that of a preferred embodiment and that the invention be limited solely by that which is within the scope of the appended claims.

We claim:

1. For use in combination with a fluidizing gravity conveyor for pulverulent material including an elongated conduit having a top, bottom and sidewalls, a gas permeable deck mounted therein dividing the conduit into an upper material chamber and a lower plenum chamber and an inlet for material to be conveyed and an outlet, a material flow control apparatus comprising:

an open body member including wall means dividing the body member into an upper flow path having a bottom wall defined by said wall means, a top and sidewalls and adapted to communicate with the upper material chamber of the conveyor and a lower flow path adapted to communicate with the lower plenum chamber of the conveyor;

a gate member mounted in the upper flow path for rotation about an axis parallel to said wall means and located above the center of said upper flow path and below top wall;

motor means operatively connected to said gate member for rotating said gate member between a position which permits material to flow through the upper flow path and a position which prevents material from flowing through the upper flow path;

a seal ring extending around said gate means for sealingly engaging the top, the bottom wall and the sidwalls of the upper flow path when said gate means is in a position to prevent material from flowing through the upper flow path to thereby prevent material from flowing through the upper flow path;

said gate member being dimensioned to substantially conform in shape to the upper flow path whereby when said gate member is rotated to a position which permits material to flow through the upper flow path, said upper flow path being uniform for substantially the complete distance between said sidewalls along said bottom wall; and means operatively associated with said gate member for controlling said motor means.

2. The combination of claim 1 wherein said gate means is at an angle to the upper flow path when said gate is in a position to prevent material from flowing through the upper flow path.

3. The combination of claim 2 further comprising a machined surface extending around said upper flow path.

4. The combination of claim 3 further comprising means operatively associated with said gate member for controlling said motor means.

* * * * *